April 15, 1958  A. J. TOTI  2,830,315
CHICKEN PICKER
Filed June 15, 1953
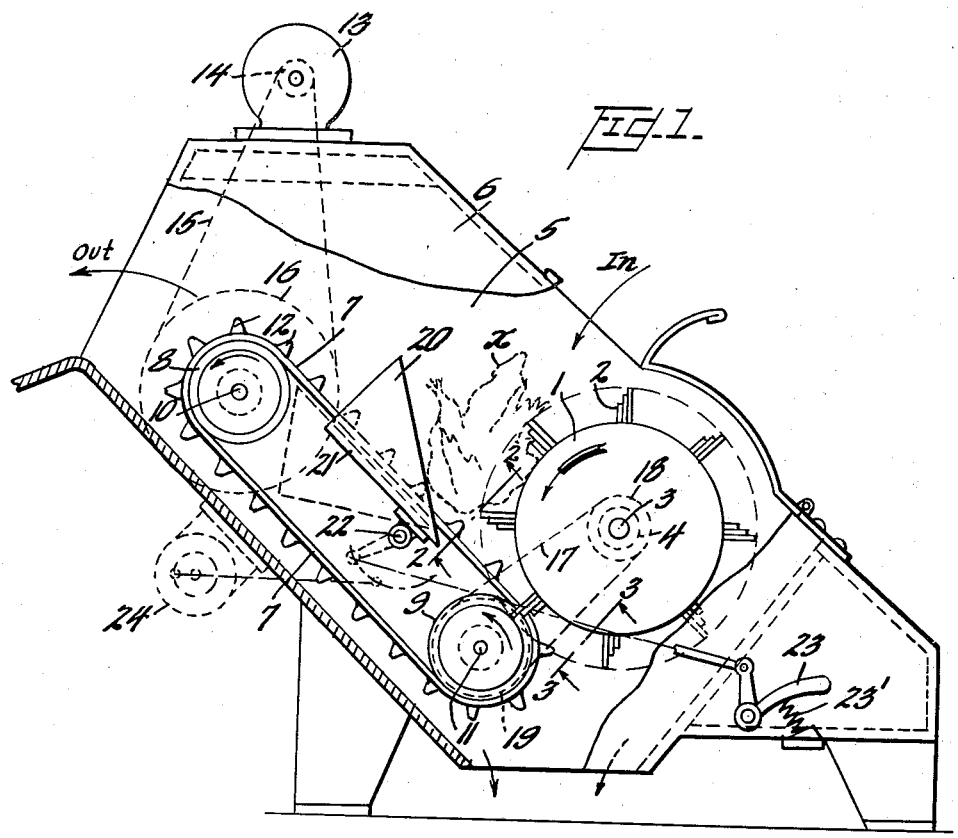
INVENTOR
Andrew J. Toti,
BY Watson, Cole, Grindle
& Watson
ATTORNEYS

United States Patent Office 2,830,315
Patented Apr. 15, 1958

2,830,315

CHICKEN PICKER

Andrew J. Toti, Modesto, Calif., assignor to Honolulu Oil Corporation, a corporation of Delaware Application June 15, 1953, Serial No. 361,461

7 Claims. (Cl. 17—11.1)

This invention relates to fowl defeathering apparatus and methods wherein the fowls are not suspended from conveyors or held in any way while being processed but are free for tumbling about and are turned about in every direction during the operation.

The principal object of the present invention is to provide a simple machine of the type outlined which will work to carry out a somewhat different method of fowl picking involved which is highly effective. The title of the case "Chicken Picker" is not to be considered restrictive as it will work on any fowl if made of suitable size.

Further objects and features of the invention will appear in the following description and accompanying drawings:

In the drawings, Fig. 1 is a side elevation of one form of a machine embodying the invention and with the near side wall broken away to reveal the mechanism mounted between the walls.

Fig. 2 is a cross section of a portion of Fig. 1 taken along the line 2—2 thereof.

Fig. 3 is a cross section of Fig. 1 taken along the line 3—3 of Fig. 1.

Briefly described the machine comprises a revolving cylindrical assemblage or drum 1 of outwardly projecting fowl striking flexible frictional defeathering elements or beaters 2 arranged in rows around the drum and with the rows spaced longitudinally of the drum as shown in Fig. 3. This drum or cylindrical assemblage is mounted on a shaft 3 (see Fig. 1) supported for revolution by bearings 4 secured to the opposite side walls 5 and 6 of the machine, while extending from below this assemblage or drum 1 is an endless belt or chain conveyor 7 which preferably runs at an angle of about 45 degrees to a point somewhat above the height of the upper side of the assemblage or drum 1 and which conveyor is mounted on pulleys (or sprockets if of chain) 8 and 9 supported on shafts 10 and 11 revolvably carried by bearings on the side walls of the machine.

Conveyor 7 is shown as a series of spaced small bands 7' (see Fig. 2) which carry a series of longitudinal rows of spaced flexible or soft fingers or projections 12, which are also laterally spaced to run between the spaced rows of defeathering fingers or fowl striking elements 2, in overlapping extension as indicated in Fig. 3, all so that as the drum assemblage 1 is revolved in the direction of the arrow to operate on a fowl dropped upon its upper side and draws the fowl downward at the left side and tends to force it under the drum, the projections 12 of the upper run of the conveyor 7 will rake or strip the fowl from the defeathering fingers 2 of the drum and carry the fowl away and upward on the conveyor, while at the same time the fowl will be revolved rapidly and turned over in every direction to become thoroughly picked in a short time (from about 10 to 20 seconds).

The conveyor and drum are operated by a motor 13 or other suitable source of power through means of suitable belting and pulleys indicated at 14 to 19, preferably at about the revolution speeds indicated on the drawing and with a drum assemblage of about 24 inches diameter at the outer ends of the "fingers" 2, and 8 inch diameter conveyor head and tail pulleys, the operation is found very satisfactory.

To prevent the fowl from being carried out of the open upper end of the machine by the conveyor, an inclined series of stripper blades 20 are provided in straddling relation to the rows of projections 12 on the conveyor belts. These strippers may be mounted as a unit on a base plate or board 21 as to be lowered from the position shown in Fig. 1 to a position shown dotted. They are secured to and pivoted on a transverse shaft 22 below the conveyor to swing into and out of operative position, and when lowered from the position shown the fowl will be thrown out of the machine by the conveyor but when in the shown position the stripper blades act as a wall to repeatedly dump the fowl back against the fast downwardly moving picking or striking elements 2 of drum assemblage 1. When the fowl is thrown out of the machine it may if desired be thrown directly into another similar machine, or others in succession if a "cascade" installation is desired, and the fowl retained but a few seconds in each machine.

The up and/or down movement of the gang stripper 20 may be automatic both ways as by any suitable power driven intermittent gear arrangement as indicated at 24 which may be set to give the required picking time interval which the particular type of fowl being processed may require, and which of course also depends on the temperature and duration of the pre-scalding treatment to which the fowls are first put, as is well known in the art. An emergency foot pedal hook-up as indicated at 23 normally lifted by a spring 23' should preferably be provided.

While in the present drawings the angle of the conveyor is shown as about 45°, this may be varied or it may be level if the wall 20 presented by the upper continuation of the strippers (or its equivalent) is high enough to dump the fowl back to the drums picking elements. Also to be noted is that the lower end of the conveyor is about on a line with the center of the drum 1, but this is not critical as it may be extended considerably without adversely affecting the results obtained.

The defeathering elements or beaters 2 may vary considerably in shape and substance as is well known in the art, but those shown are spaced groups of several strips of plain rubber or similar friction material of rectangular cross section about 3 or 4 inches long.

The proportions of the various parts and their relation to each other are taken from a successfully operating machine, though they may be varied. It is also evident that the machine may be made wide enough to accommodate several fowls at once along the drum.

Having thus described my improved apparatus and the manner of its operation and use, what I claim is:

1. In a fowl picking machine, a cylindrical assemblage of outwardly projecting flexible picking elements, means for revolving said assemblage for striking a fowl with said elements when placed adjacent thereto, a conveyor movable adjacent said assemblage provided with projections adapted to engage a fowl tending to be dragged around said assemblage and carry the fowl away, and means moving said conveyor in the opposite direction from the movement of the elements of said assemblage adjacent said conveyor, means active against said conveyor at a point distant from said assemblage adapted to interrupt the travel of the fowl and return them to position for re-striking with said picking elements.

2. In a fowl picking machine, a cylindrical assemblage of outwardly projecting flexible picking elements, means for revolving said assemblage for striking a fowl with said elements when placed adjacent thereto, a conveyor movable adjacent said assemblage provided with projections adapted to engage a fowl tending to be dragged around said assemblage and carry the fowl away, and means moving said conveyor in the opposite direction from the movement of the elements of said assemblage adjacent said conveyor, said conveyor movable upward in a direction away from said assemblage of picking elements, and means active against said conveyor at a point distant from said assemblage adapted to interrupt the travel of the fowl for falling to position for re-striking with said picking elements.

3. In a flexible frictional fowl picking machine a cylindrical assemblage of fowl defeathering elements arranged in spaced circular rows, means for revolving said assemblage on its longitudinal axis for operating against a fowl, and a conveyor provided with fowl engaging elements arranged in spaced longitudinal rows arranged to move adjacent said cylindrical assemblage with its rows of elements passing in between the spaced circular rows of elements of said assemblage, and means for moving said conveyor in the opposite direction from the movement of the elements of said assemblage adjacent said conveyor, for stripping away any fowl tending to be carried around said assemblage.

4. In a fowl picking machine a cylindrical assemblage of fowl picking elements arranged in spaced circular rows, means for revolving said assemblage on its longitudinal axis for operating against a fowl, and a conveyor provided with fowl engaging elements arranged in spaced longitudinal rows arranged to move adjacent said cylindrical assemblage with its rows of elements passing in between the spaced circular rows of said assemblage, and means for moving said conveyor in the opposite direction from the movement of the elements of said assemblage adjacent said conveyor, for stripping away any fowl tending to be carried around said assemblage, and stripper means cooperating with said conveyor engaging and removing the fowl therefrom and returning said fowl to a position to be operated upon.

5. In a fowl picking machine a cylindrical assemblage of fowl picking elements arranged in spaced circular rows, means for revolving said assemblage on its longitudinal axis for operating against a fowl, and a conveyor provided with fowl engaging elements arranged in spaced longitudinal rows arranged to move adjacent said cylindrical assemblage with its rows of elements passing in between the spaced circular rows of said assemblage, and means for moving said conveyor in the opposite direction from the movement of the elements of said assemblage adjacent said conveyor, for stripping away any fowl tending to be carried around said assemblage, and stripper means cooperating with said conveyor engaging and removing the fowl therefrom and returning said fowl to a position to be operated upon, and means for rendering said stripper means ineffective so that said conveyor will carry away and discharge said fowl.

6. In a fowl picking machine a cylindrical assemblage of fowl picking elements arranged in spaced circular rows, means for revolving said assemblage on its longitudinal axis for operating against a fowl, and a conveyor provided with fowl engaging elements arranged in spaced longitudinal rows arranged to move adjacent said cylindrical assemblage with its rows of elements passing in between the spaced circular rows of said assemblage, and means for moving said conveyor in the opposite direction from the movement of the elements of said assemblage adjacent said conveyor, for stripping away any fowl tending to be carried around said assemblage and stripper means cooperating with said conveyor engaging and removing the fowl therefrom and returning said fowl to a position to be operated upon, and means for automatically periodically rendering said stripper means ineffective so that said conveyor will carry away and discharge said fowl.

7. In a free loose fowl picking machine, means forming an assemblage of spaced rows of flexible frictional defeathering beaters, means rapidly moving the assemblage downward for striking a loose fowl presented thereto for tumbling and dragging fowl downward thereby, means for so guiding fowl thereto, and conveyor means provided with spaced rows of projections positioned intermediate the rows of the heaters arranged to engage the fowl so dragged down and rake them free from said beaters and repeatedly carry the fowl upward to position to fall back from a higher position into striking relation with said beaters in repetition.

References Cited in the file of this patent

UNITED STATES PATENTS

| | | |
|---|---|---|
| 1,167,573 | Kohlhepp | Jan. 11, 1916 |
| 1,210,951 | Kohlhepp | Jan. 2, 1917 |
| 1,260,269 | Kohlhepp | Mar. 19, 1918 |
| 2,311,365 | Campbell | Feb. 16, 1943 |

UNITED STATES PATENT OFFICE

CERTIFICATE OF CORRECTION

Patent No. 2,830,315　　　　　　　　　　　　　　　April 15, 1958

Andrew J. Toti

It is hereby certified that error appears in the printed specification of the above numbered patent requiring correction and that the said Letters Patent should read as corrected below.

Column 4, line 35, for "heaters" read -- beaters --.

Signed and sealed this 15th day of July 1958.

(SEAL)
Attest:

KARL H. AXLINE
Attesting Officer

ROBERT C. WATSON
Commissioner of Patents